United States Patent Office 2,811,213
Patented Oct. 29, 1957

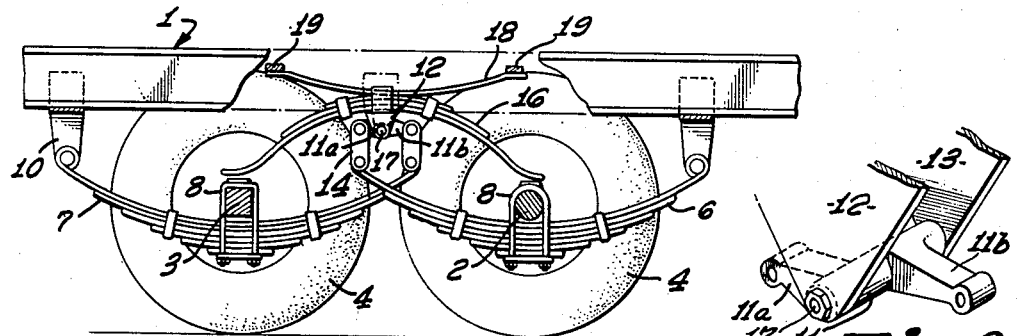
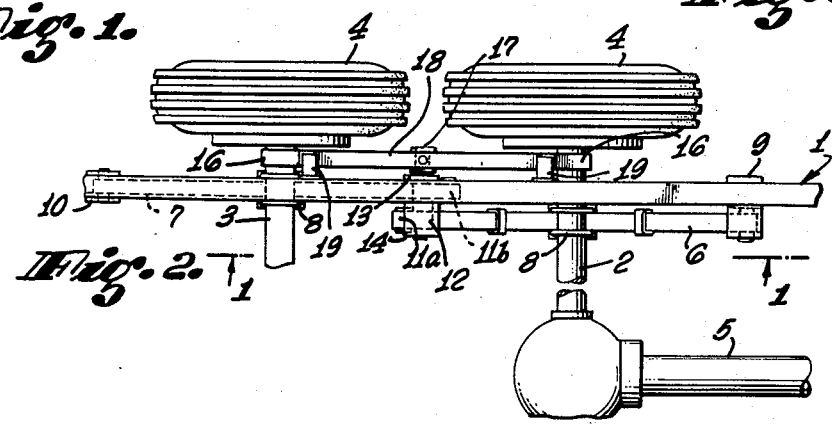
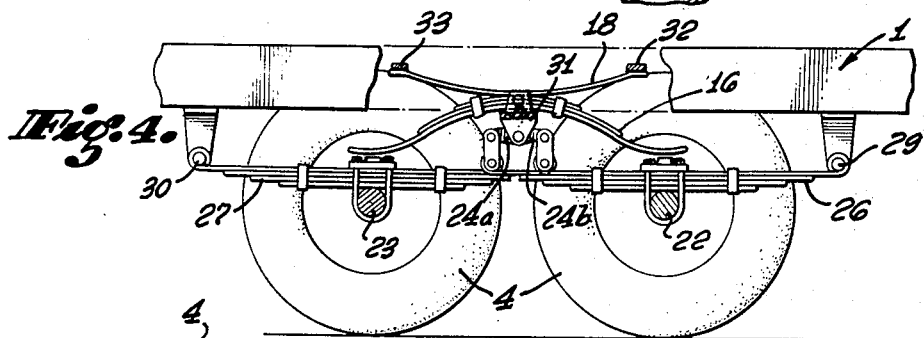
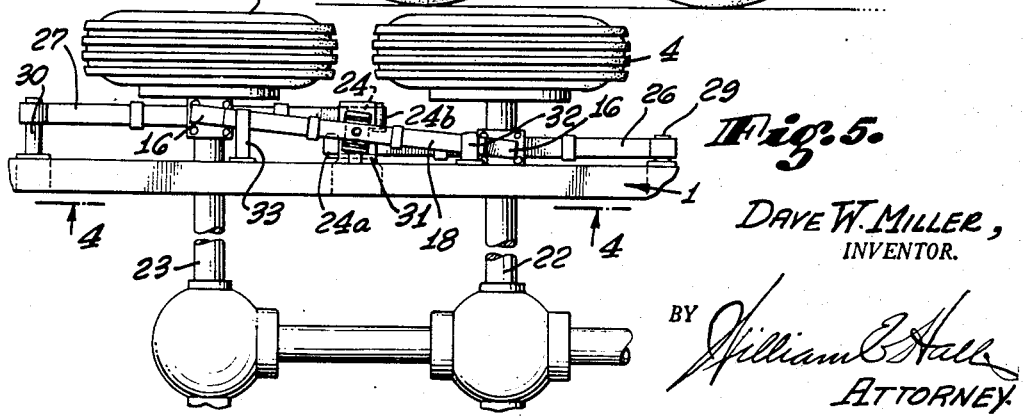

2,811,213

TANDEM AXLE SUSPENSION AND OVERLOAD SPRING THEREFOR

Dave W. Miller, Roswell, N. Mex.

Application August 31, 1955, Serial No. 533,314

2 Claims. (Cl. 180—22)

My invention relates to spring suspensions for vehicles having tandem rear axles and wheels.

One of the principal objects of this invention is to provide a spring suspension means of this class which is particularly designed to support or suspend a vehicle frame having a pair of rear axles with closely positioned wheels, and which means comprises pairs of springs at opposite sides of the vehicle and in which the springs of each pair are located at substantially the same elevation and in which the end portions are freely operable, within their limits, in vertical directions.

Another important object of this invention is to provide a spring suspension means of this class which is so designed that one of the rear axles supports a greater portion of the load of the vehicle than the other, such construction being particularly applicable to a vehicle in which only one of the axles is driven, so that greater traction may be obtained through such driven axle.

An important object also of this invention is to provide novel means of supporting the adjacent ends of leaf springs of the spring means at the opposite side of the vehicle.

A further important object of this invention is to provide a novel arrangement of an overload spring in association with vehicle supporting or suspending springs of this class.

A still further important object of this invention is to provide a novel equalizing spring for an overload spring of the nature described.

This application is a substitute for applicant's prior abandoned application Serial No. 7,021, filed Feb. 7, 1948, entitled "Vehicle Spring Suspension."

With these and other objects in view, as will appear hereinafter, I have devised a spring suspension means having certain novel features of construction, combination, and arrangement of parts and portions, as will be hereinafter described in detail, and particularly set forth in the appended claims, reference being had to the accompanying drawings and to the characters of reference thereon, which form a part of this application, in which:

Fig. 1 is a sectional elevational view, taken through 1—1 of Fig. 2, of the rear portion of a vehicle showing my spring suspension means in one form for supporting the vehicle on the rear wheels thereof;

Fig. 2 is a fragmentary view thereof in plan;

Fig. 3 is a fragmentary perspective view, showing the bracket for supporting the vehicle on the adjacent ends of two springs;

Fig. 4 is a sectional elevational view, similar to that of Fig. 1, and taken at 4—4 of Fig. 5, showing my spring suspension means in a slightly modified form; and, Fig. 5 is a fragmentary view in plan, similar to that shown in Fig. 2, but of the modified structure of Fig. 4.

The vehicle frame 1, shown in Figs. 1 and 2, is of the rear end portion of the vehicle and is supported on dual axles 2 and 3, both supported at their ends on wheels 4. The axle 2 may be driven by conventional means through a drive shaft indicated by 5.

The frame 1 is supported or suspended from the axles 2 and 3 by springs 6 and 7, which are in the form of the usual multiple leaf vehicle springs. As here shown, the intermediate portions of the springs are positioned below the axles 2 and 3 and are secured thereto by U-bolts 8. The forward end of the spring 6 is secured to the lower end of a bracket 9, extending downwardly from the frame, and the rear end of the spring 7 is similarly connected to the lower end of a bracket 10, extending downwardly from the frame but positioned inwardly thereof, as shown in Fig. 2.

The adjacent ends of the springs, namely, the rear end of the forward spring 6 and the forward end of the rear spring 7, are pivotally connected to the ends of arms $11^a$ and $11^b$ of a rock shaft 11, which is pivotally mounted at its ends on brackets 12 and 13 extending downwardly from the vehicle frame approximately intermediate the tandem wheels. The arms $11^a$ and $11^b$ extend substantially in diametrically opposed directions from the pivotal axis of the rock shaft and are laterally offset relative to each other with respect to the longitudinal axis of the rock shaft, as shown in Figs. 2 and 3.

It will be here noted that the arm $11^a$, which is connected to the rear end of the spring 6 mounted on the drive axle 2, is considerably shorter than the arm $11^b$. Thus, a greater load of the vehicle is carried by the drive axle 2, thereby providing greater traction for the drive axle.

The outer ends of the springs 6 and 7 are shown as directly pivotally mounted on the brackets 9 and 10, while the ends of the springs are shackled by links 14 to the ends of the arms $11^a$ and $11^b$ to compensate for the variation in length of the springs 6 and 7.

A shock absorber or overload spring 16 provides resilient means for extreme loads on the axles. This spring 16 may also be a multiple leaf spring, which is substantially pivotally mounted intermediate its ends at the axis of the rock shaft 11, and, as shown in Fig. 2, is positioned at the outer side of the outer bracket 13 and mounted on the bolt 17 supporting the rock shaft. The ends of the overload spring 16 are positioned to be engaged by the axles 2 and 3, in such a manner that an overload on one of the wheels, as when the latter hits a high spot, is partly transmitted to or partly carried by the low wheel on the other axle.

Connected to the median and upper portion of the overload spring is an equalizing leaf spring 18, the ends of which are positioned to engage the under sides of lugs 19 carried at the outer side of the vehicle frame. Each equalizing spring is employed for the purpose of centering the overload spring 16, in order normally to dispose the ends thereof in proximity to and in equally spaced positions above the axles 2 and 3.

In the structure shown in Figs. 4 and 5, both the front and rear axles 22 and 23 are shown as driven axles. In this instance, the same load of the vehicle is to be carried by the wheels 4 at the ends of the axles, and for this reason the arms $24^a$ and $24^b$ of the rock shaft 24 are of the same length outwardly from the axis of the rock shaft.

A similar construction of the arms of the rock shaft are employed, when the axles 22 and 23 are not driven, as when the tandem construction is used in supporting the frame of a trailer in which neither of the axles are driven.

In the structure shown in Figs. 4 and 5, the intermediate portions of the springs 26 and 27 are supported above the axles, thus bringing the springs closer to the under side of the vehicle frame. In this instance, therefore the springs 26 and 27 are shown as positioned at the outer side of the vehicle frame, as illustrated in Fig. 5. The brackets 29 and 30, to which the remote ends of the springs 26 and 27 are connected, extend laterally outwardly from the frame. The rock shaft 25 is here also shown as positioned outwardly from the frame and mounted on a bracket 31, which is also constructed to depend outwardly and downwardly from the frame. The overload spring 16 and the equalizing spring 18, in this instance, are shown as mounted on the upper portion of the rock shaft. The lugs for stabilizing the equalizing spring are, in this instance, shown as brackets 32 and 33 which also extend laterally outwardly from the vehicle frame. The construction and operation of the spring suspension means in the modified form is otherwise similar to that above described.

I wish it to be understood that I do not desire to be limited to the exact details of construction shown and described, for obvious modifications will occur to a person skilled in the art.

I claim:

1. In a vehicle spring suspension, a vehicle frame, a pair of closely positioned parallel axles supporting said frame, a leaf spring for each end of each axle and connected intermediate their ends thereto, the springs at each side of the vehicle being positioned at substantially the same elevation but laterally offset with respect to each other, the forward ends of the forward springs and the rear ends of the rear springs being pivotally connected to the frame, a rock shaft mounted on each side of the frame over the adjacent free end portions of the springs, each rock shaft having a forwardly directed arm and a rearwardly directed arm, said arms being laterally offset with respect to each other and relative to the longitudinal axis of the shaft, each forwardly directed arm being pivotally connected to the forward end of each of the respective rear springs, and the rearwardly directed arm of each rock shaft being pivotally connected to the rear end of each of the respective forward springs, overload leaf springs, one at each side of the frame, the overload springs being mounted intermediate their ends on the frame with their ends adjacent the upper sides of the axles, and a pair of equalizer leaf springs, one at each side of the frame, each equalizer spring being connected at its central portion to the central portion of a said overload spring, the ends of each equalizer spring engaging lugs on the frame and operative to pivot said overload spring on the frame so as to normally maintain the ends of the overload spring in proximity to the axles.

2. In a vehicle spring suspension, a vehicle frame, a pair of closely positioned parallel axles supporting said frame, one of said axles being a drive axle and the other an idler axle, a leaf spring for each end of each axle and connected intermediate their ends thereto, the springs at each side of the vehicle being positioned at substantially the same elevation but laterally offset with respect to each other, the forward ends of the forward springs and the rear ends of the rear springs being pivotally connected to the frame, a rock shaft mounted on each side of the frame over the adjacent free end portions of the springs, each rock shaft having a forwardly directed arm and a rearwardly directed arm, said arms being laterally offset with respect to each other and relative to the longitudinal axis of the shaft, each forwardly directed arm being pivotally connected to the forward end of the respective rear spring, and the rearwardly directed arm of each rock shaft being pivotally connected to the rear end of each of the respective forward springs, the arms of each rock shaft connected to the spring related to the drive axle being short and the other long so as to exert a greater load on the drive axle, overload leaf springs, one at each side of the frame, the overload springs being pivotally mounted intermediate their ends on the frame with their ends adjacent the upper sides of the axles, and an equalizer leaf spring at each side of the frame, the ends of each equalizer spring engaging lower surfaces of longitudinally spaced lugs on the frame, the intermediate portions of each equalizer spring being connected to the central portion of said overload spring, said equalizer spring acting to normally retain the overload spring centered with its ends in proximity to the axles.

References Cited in the file of this patent

UNITED STATES PATENTS

| 1,908,751 | Gurney | May 16, 1933 |
| 1,973,144 | Fageol | Sept. 11, 1934 |
| 2,378,704 | Harbers | June 19, 1945 |

FOREIGN PATENTS

| 247,403 | Great Britain | Feb. 18, 1926 |